Oct. 23, 1956     M. O'HIGGINS     2,767,761

TIRE TRACTION INCREASING DEVICE

Filed May 12, 1954

INVENTOR
MICHAEL O'HIGGINS

BY *J.B. Dickman Jr.*
ATTORNEY

United States Patent Office 2,767,761
Patented Oct. 23, 1956

2,767,761

TIRE TRACTION INCREASING DEVICE

Michael O'Higgins, Washington, D. C.

Application May 12, 1954, Serial No. 429,270

1 Claim. (Cl. 152—218)

This invention relates to anti-skid devices and has for its primary object the provision of such a device which is easily placed in position and easily removed.

A further object of my invention is to provide an anti-skid device which engages the tire only, and having no connection with the axle, wheel or any other portion of the car.

A further object of my invention is to provide an anti-skid device for tires which has centrally located operating means.

A still further object of my invention is to provide an anti-skid device having a plurality of tire engaging means.

A still further object of the invention is to provide an anti-skid device having a plurality of tire engaging arms, with each of said arms resiliently tensioned.

This invention also consists in certain other features of construction and in the combination and arrangement of the several parts to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 1:
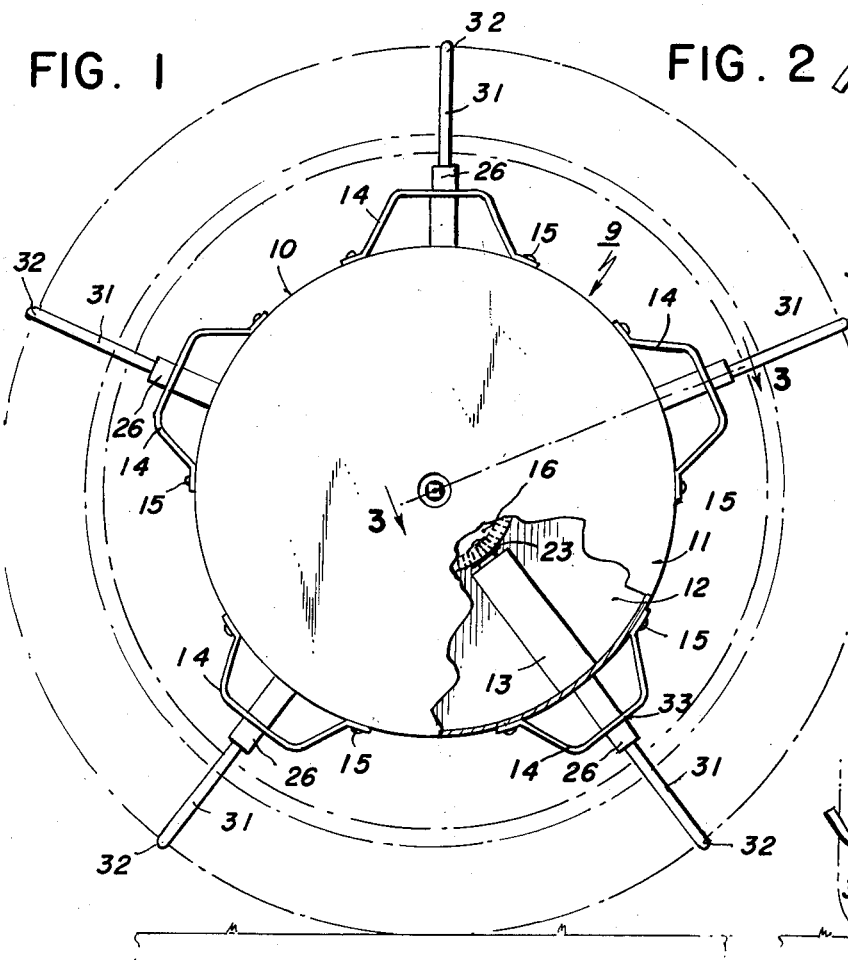
Fig. 1 is a plan view of the device attached to a tire.

Referring to the drawings in detail, numeral 9 represents the traction device, generally said device comprising a circular frame member 10 having enclosing side plates 11 and 12 forming a housing. Tubular sleeves 13 are positioned between the plates in spaced relation for a purpose to be later described.

Spaced around the periphery of the circular frame member 10 are upstanding brackets 14, secured to the frame member by any suitable means, rivets 15 being shown in the drawings.

Centrally disposed within the side plates 11 and 12 of the device is a bevel gear 16 having an integral crank engaging lug 17 thereon. An aperture 18 in the central portion of the side plate 12 makes the lug 17 externally accessible for a wrench. The gear 16 has on its side opposite from the lug 17, a bearing shaft 19, rotatably mounted in a bearing 20. A housing 21 is bolted to the side plate 11 by bolts 22 and supports the bearing 20 therein.

Mating with the bevel gear 16 are bevel gears 23 formed on the inner ends of tubular internally threaded members 24, said members being rotatably mounted in said sleeves 13 by means of bearings 25.

Second tubular members 26 having external threads 27, fit within the tubular members 24, the respective threads on the tubular members engaging. Tension springs 28, having ends 29 and 30 are positioned within the tubular members 26, the ends 29 being secured to the inner ends of the tubular member 26, the ends 30 being secured to the inner ends of the shafts of traction members 32, said shafts being slidably mounted in the tubular members 26.

The tubular members 26 pass through bores 33 in the brackets 14, said brackets acting as supporting and guiding means for the tubular members 26.

Figure 2:
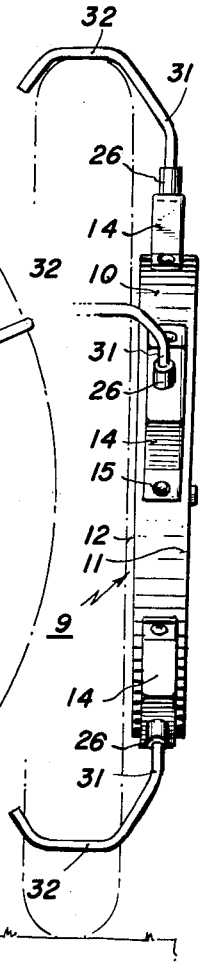
Fig. 2 is a side elevation showing the device attached to a tire.
Figure 3:
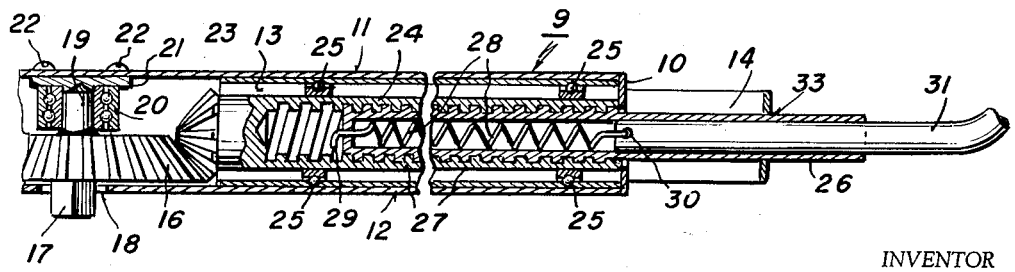
Fig. 3 is a cross sectional view of the device taken generally on the line 3—3 of Fig. 1.

In the operation of the device, the traction device 9 will be placed adjacent a wheel of an automobile, with the traction members 32 overlying the tire (as shown in Fig. 2). A crank or wrench (not shown) of any suitable size is then applied to the lug 17 and the lug rotated in a clockwise direction. The bevel gear 16 rotating against the mating gear 23 causes the tubular member 24 to revolve within the bearings 25, the internal threads of tubular member 24 engaging external threads 27 of tubular member 26. As the threads engage, the member 26 carrying with it shaft 31 is withdrawn into tubular member 24, and this inward movement is continued until traction members 32 tightly engage the tire. The wrench is then removed from the lug 17 and the device is in operative position.

It will be apparent that the tension springs 28 will maintain a tight engagement between the tire and the traction members 32 at all times, even if the air pressure drops somewhat in the tire. Also, in going over rough roads, ruts in snow and ice, the tire will be continually flexed and distorted at the ground engaging portion, but the slidable mounting of shafts 31 within tubular housings 26 under tension of the springs 28 will allow the traction members 32 to always maintain firm contact with the tire, and thus prevent damage to or loosening of the traction device from the tire.

The brackets 14 act as reinforcing and bearing members for the tubular members 26 as they slide within the bores 33 of said brackets. Jars or shocks which might damage or twist the members 26 and prevent proper functioning are minimized by this additional support given by the brackets 14.

It will be apparent that the device can be easily removed and placed in position, as the varying types of driving conditions occur, even by women or persons unfamiliar with traction increasing devices such as chains. The corresponding parts of the device are identical, thus allowing for mass production, ease in assembling and repair, with a corresponding lessening of the cost.

Since certain changes may be made in the above described construction, and different embodiments of the invention may be made without departing from the spirit or scope thereof, it is intended that all the material contained in the above description or shown in the accompanying drawing shall be considered as illustrative and not in a limiting sense, except as defined by the scope and spirit of the appended claim.

What is claimed is:

A traction increasing device for automobile tires comprising a housing, a gear centrally disposed in said housing and rotatably secured thereto, a plurality of threaded tubular members radially disposed in said housing and having gears formed on their inner ends, other threaded tubular members movably disposed in said first named tubular members, and traction members movably disposed in said second named tubular members, said centrally disposed gear mating with the gears on the inner ends of said first named tubular members to cause movement of said second named tubular members when said centrally disposed gear is rotated.

References Cited in the file of this patent

UNITED STATES PATENTS

| | | |
|---|---|---|
| 2,423,759 | Edwards | July 8, 1947 |
| 2,517,634 | Daley | Aug. 8, 1950 |
| 2,529,427 | Snedeker | Nov. 7, 1950 |
| 2,598,298 | Pindjak | May 27, 1952 |